United States Patent
Shrivastava et al.

(10) Patent No.: US 12,100,189 B2
(45) Date of Patent: Sep. 24, 2024

(54) THREE-DIMENSIONAL OBJECT DETECTION

(71) Applicant: Ford Global Technologies, LLC, Dearborn, MI (US)

(72) Inventors: Shubham Shrivastava, Santa Clara, CA (US); Punarjay Chakravarty, Campbell, CA (US); Gaurav Pandey, College Station, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 17/550,648

(22) Filed: Dec. 14, 2021

(65) Prior Publication Data
US 2023/0186587 A1    Jun. 15, 2023

(51) Int. Cl.
*G06V 10/82* (2022.01)
*B60W 10/20* (2006.01)
(Continued)

(52) U.S. Cl.
CPC .............. *G06V 10/25* (2022.01); *B60W 10/20* (2013.01); *G06N 3/088* (2013.01); *G06T 7/20* (2013.01); *G06V 10/469* (2022.01); *G06V 10/82* (2022.01)

(58) Field of Classification Search
CPC ...... G06V 10/82; G06V 10/454; G06V 20/58; G06V 2201/08; G06V 10/25; G06V 10/255; G06V 10/469; G06V 10/62; G06V 10/806; G06V 20/00; G06V 20/56; G06V 20/64; G06V 20/647; G06V 30/19173; G06T 2207/20084; G06T 2207/20081; G06T 2207/30236; G06T 2207/30261; G06T 11/60; G06T 15/205; G06T 17/00;
(Continued)

(56) References Cited

U.S. PATENT DOCUMENTS 10,297,070 B1   5/2019   Zhu et al.
10,304,191 B1   5/2019   Mousavian et al.
(Continued)

FOREIGN PATENT DOCUMENTS

CN    113673444 A   * 11/2021

OTHER PUBLICATIONS

Liu, "Lifting 2D object detection to 3D in autonomous driving", https://towardsdatascience.com/geometric-reasoning-based-cuboid-generation-in-monocular-3d-object-detection-5ee2996270d1.
(Continued)

*Primary Examiner* — Ian L Lemieux
(74) *Attorney, Agent, or Firm* — Frank A. MacKenzie; Bejin Bieneman PLC

(57) ABSTRACT

An image can be input to a deep neural network to determine a point in the image based on a center of a Gaussian heatmap corresponding to an object included in the image. The deep neural network can determine an object descriptor corresponding to the object and include the object descriptor in an object vector attached to the point. The deep neural network can determine object parameters including a three-dimensional location of the object in global coordinates and predicted pixel offsets of the object. The object parameters can be included in the object vector, and the deep neural network can predict a future location of the object in global coordinates based on the point and the object vector.

20 Claims, 10 Drawing Sheets

(51) Int. Cl.
  *G06N 3/088* (2023.01)
  *G06T 7/20* (2017.01)
  *G06V 10/25* (2022.01)
  *G06V 10/46* (2022.01)

(58) Field of Classification Search
  CPC ....... G06T 2200/04; G06T 2207/10028; G06T 2207/20164; G06T 2207/30252; G06T 2210/04; G06T 2210/12; G06T 2210/22; G06T 7/11; G06T 7/50; G06T 7/60; G06T 7/70; G06T 7/73; G06T 2207/30196; G06T 2207/30241; G06T 2210/61; G06T 7/20; G06T 7/246; G06N 3/088; G06N 3/045; G06N 3/044; G06N 3/084; G01S 7/417
  See application file for complete search history.

(56) References Cited

U.S. PATENT DOCUMENTS

| | | | |
|---|---|---|---|
| 10,438,371 | B2 | 10/2019 | Xu et al. |
| 10,762,644 | B1* | 9/2020 | Mahadevan ............ G06T 7/251 |
| 2019/0258878 | A1* | 8/2019 | Koivisto ................. G01S 7/417 |
| 2021/0183241 | A1* | 6/2021 | Lee .................. G08G 1/096775 |

OTHER PUBLICATIONS

Mousavian et al., "3D Bounding Box Estimation Using Deep Learning and Geometry", arXiv:1612.00496v2 [cs.CV] Apr. 10, 2017.
Shrivastava, "VR3Dense: Voxel Representation Learning for 3D Object Detection and Monocular Dense Depth Reconstruction", arXiv:2104.05932v1 [cs.CV] Apr. 13, 2021.

* cited by examiner

THREE-DIMENSIONAL OBJECT DETECTION

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more images sensors that can be processed to determine locations of objects. Object location data extracted from images can be used by a computer to operate systems including vehicles, robots, security, and object tracking systems.

DETAILED DESCRIPTION

Figure 1:
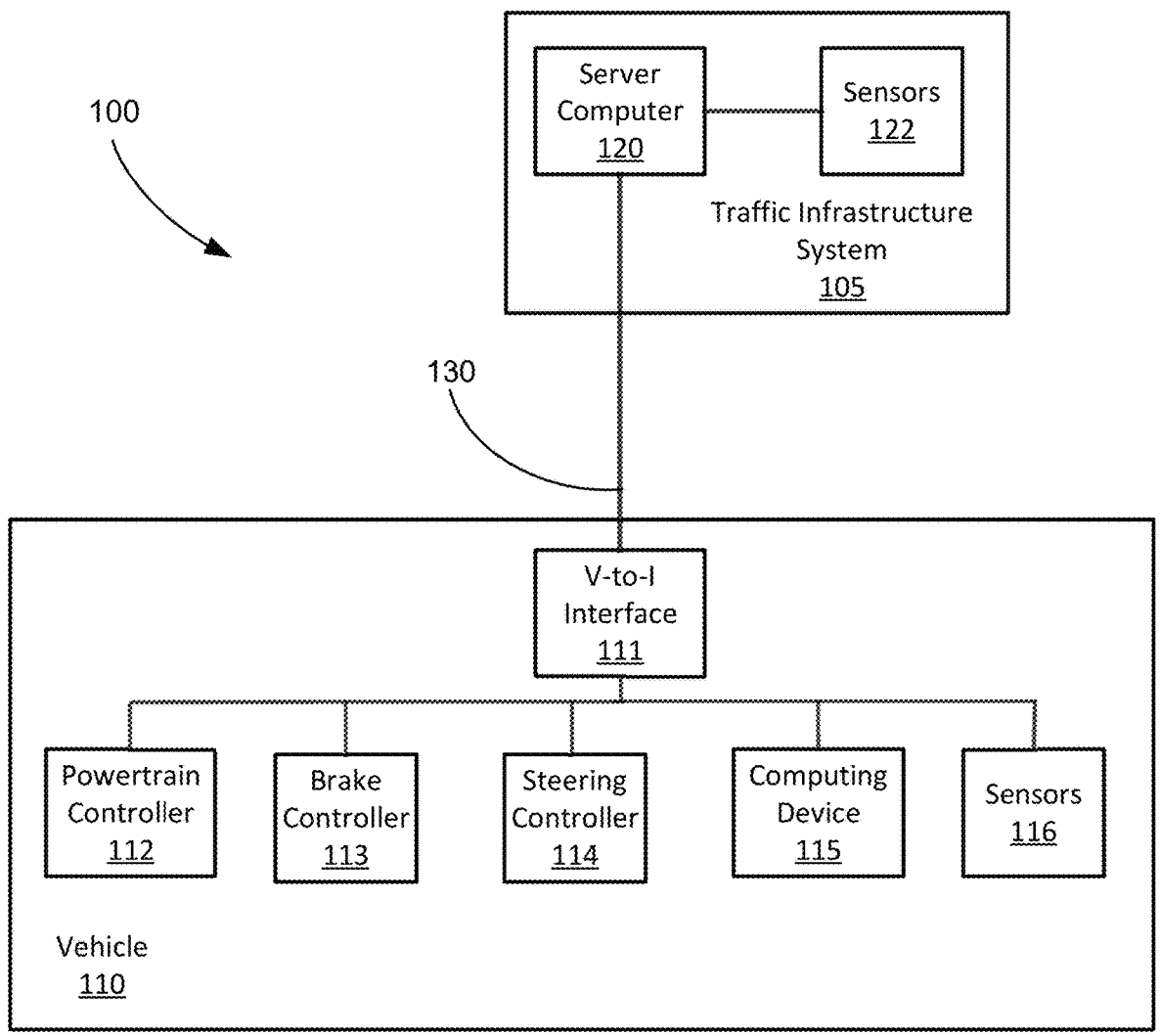
FIG. 1 is a block diagram of an example traffic infrastructure system.

A sensing system can acquire data, for example image data, regarding an environment around the system and process the data to determine identities and/or locations of objects. For example, a deep neural network (DNN) can be trained and then used to determine objects in image data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, a DNN can determine the location and orientation of one or more parts in an environment that includes a plurality of parts. In a product tracking system, a deep neural network can determine a location and orientation of one or more packages in an environment that includes a plurality of packages.

Vehicle guidance will be described herein as a non-limiting example of using a computer to detect objects, for example vehicles and pedestrians, in a traffic scene and determine a vehicle path for operating a vehicle based on the detected objects. A traffic scene is an environment around a traffic infrastructure system or a vehicle that can include a portion of a roadway and objects including vehicles and pedestrians, etc. For example, a computing device in a vehicle or traffic infrastructure system can be programmed to acquire one or more images from one or more sensors included in the vehicle or the traffic infrastructure system, detect objects in the images and communicate labels that identify the objects along with locations of the objects.

The sensors can include video or still image cameras that acquire images corresponding to visible or infrared wavelengths of light. The sensors can be included in the vehicle or can be stationary and can be mounted on poles, buildings, or other structures to give the sensors a view of the traffic scene including objects in the traffic scene. Sensors can also include lidar sensors, which typically emit infrared wavelengths of light, radar sensors which emit radio waves, and ultrasound sensors which emit sound waves. Lidar, radar, and ultrasound sensors all measure distances to points in the environment. In some examples sensors included in a vehicle can acquire one or more images of a traffic scene and process the images to determine locations of objects included in the images. The location of the objects can permit a computing device in the vehicle to determine a vehicle path upon which to operate the vehicle. In some examples, stationary sensors included in a traffic infrastructure system can provide data regarding objects in a traffic scene to augment data acquired by sensors included in the vehicle, for example.

Advantageously, techniques described herein can improve the ability of a computing device in a vehicle to predict future locations of objects in an environment around the vehicle using a monocular RGB camera. A monocular camera includes a single lens assembly having a single optical axis that forms images on a single sensor or sensor assembly. An RGB camera is a camera that acquires color image data that includes separate red, green and blue pixels. Images acquired by a monocular RGB camera can be processed using a deep neural network (DNN) to determine three-dimensional (3D) object data from monocular RGB image data. Determining 3D object data from monocular RGB image data based on DNN processing requires less expensive sensors and fewer computing resources to determine 3D object data compared to stereo RGB cameras or lidar sensors, for example.

A method is disclosed herein, including inputting an image to a deep neural network to determine a point in the image based on a center of a Gaussian heatmap corresponding to an object included in the image, determine an object descriptor corresponding to the object and include the object descriptor in an object vector attached to the point and determine object parameters including a three-dimensional location of the object in global coordinates and predicted pixel offsets of the object. The object parameters can be included in the object vector; and a future location of the object in the global coordinates can be predicted based on the point and the object vector. A vehicle can be operated by determining a vehicle path based on the future location of the object. Operating the vehicle on the vehicle path can include controlling one or more of vehicle powertrain, vehicle steering, and vehicle brakes. The object can be a moving object. The deep neural network can track the object in one or more frames of image data based on the object descriptor.

The deep neural network can determine the three-dimensional location of the object in the global coordinates based on an estimated distance from a camera and the point corresponding to the center of the Gaussian heatmap. A yaw of the object can be determined in the global coordinates based on the yaw of the object in pixel coordinates and the three-dimensional location of the object in the global coordinates. The future location of the object in the global coordinates can be determined based on the predicted pixel offsets of the object and the three-dimensional location of the object. The deep neural network can be trained based on unsupervised learning. The deep neural network can be trained based on ground truth determined based on one or more pairs of stereo images. The deep neural network can be trained based on object class prediction loss functions, depth perception loss functions, three-dimensional prediction loss functions, push object descriptor loss functions, and pull object descriptor loss functions. The Gaussian heatmap can correspond to a two-dimensional probability distribution of locations of a center of the object. The center of the object can be based on a two-dimensional bounding box corresponding to a face of a three-dimensional bounding box. The three-dimensional bounding box can be determined by the deep neural network.

Further disclosed is a computer readable medium, storing program instructions for executing some or all of the above method steps. Further disclosed is a computer programmed for executing some or all of the above method steps, including a computer apparatus, programmed to inputting an image to a deep neural network to determine a point in the image based on a center of a Gaussian heatmap corresponding to an object included in the image, determine an object descriptor corresponding to the object and include the object descriptor in an object vector attached to the point and determine object parameters including a three-dimensional location of the object in global coordinates and predicted pixel offsets of the object. The object parameters can be included in the object vector; and a future location of the object in the global coordinates can be predicted based on the point and the object vector. A vehicle can be operated by determining a vehicle path based on the future location of the object. Operating the vehicle on the vehicle path can include controlling one or more of vehicle powertrain, vehicle steering, and vehicle brakes. The object can be a moving object.

The instructions can include further instructions to instruct the deep neural network to track the object in one or more frames of image data based on the object descriptor. The deep neural network can determine the three-dimensional location of the object in the global coordinates based on an estimated distance from a camera and the point corresponding to the center of the Gaussian heatmap. A yaw of the object can be determined in the global coordinates based on the yaw of the object in pixel coordinates and the three-dimensional location of the object in the global coordinates. The future location of the object in the global coordinates can be determined based on the predicted pixel offsets of the object and the three-dimensional location of the object. The deep neural network can be trained based on unsupervised learning. The deep neural network can be trained based on ground truth determined based on one or more pairs of stereo images. The deep neural network can be trained based on object class prediction loss functions, depth perception loss functions, three-dimensional prediction loss functions, push object descriptor loss functions, and pull object descriptor loss functions. The Gaussian heatmap can correspond to a two-dimensional probability distribution of locations of a center of the object. The center of the object can be based on a two-dimensional bounding box corresponding to a face of a three-dimensional bounding box. The three-dimensional bounding box can be determined by the deep neural network.

FIG. 1 is a diagram of a sensing system 100 that can include a traffic infrastructure system 105 that includes a server computer 120 and stationary sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-tovehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
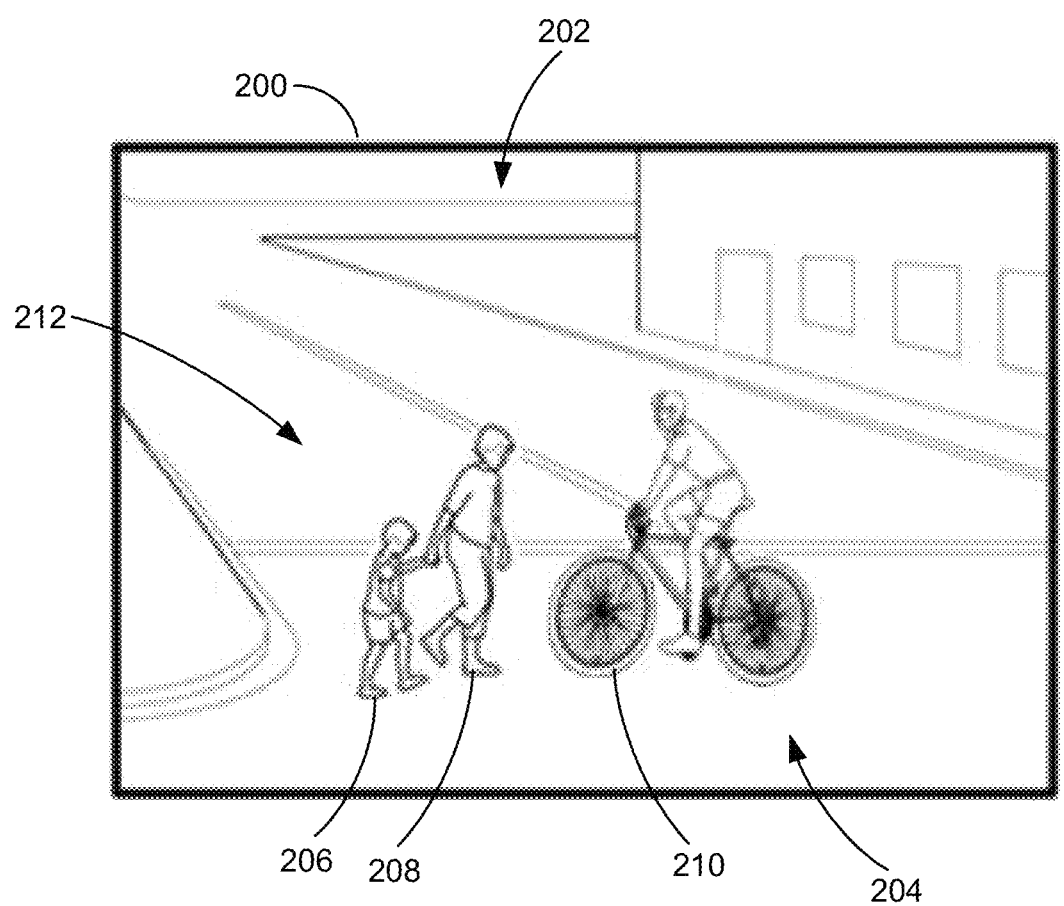
FIG. 2 is a diagram of an example image of a traffic scene.

FIG. 2 is a diagram of an image 200 of a traffic scene 202. Traffic scene 202 includes a roadway 204, and pedestrians 206, 208 and a bicyclist 210. Pedestrians 206, 208 and bicyclist 210 can be referred to collectively as moving objects 212. The image 200 of traffic scene 202 can be acquired by a sensor 116 included in a vehicle 110. Image 200 can be acquired by a monocular RGB camera. The monocular RGB camera can be a video camera that can acquire a plurality of images 200 as frames of RGB image data at frame rates of up to 60 frames per second, for example. The image 200 can also be acquired by a stationary sensor 122 included in a traffic infrastructure system 105. The stationary sensor 122 can be mounted on a camera mount, which can include traffic signal poles, light poles, purpose-built poles or mounts, buildings, or existing structures such as bridges, overpasses, or sign poles. The stationary sensor 122 can be a video camera and acquire a plurality of frames of RGB color images. The images 200 acquire by a stationary sensor 122 can be communicated to a computing device 115 in a vehicle 110 by a server computer 120 included in a traffic infrastructure system 105.

Figure 3:
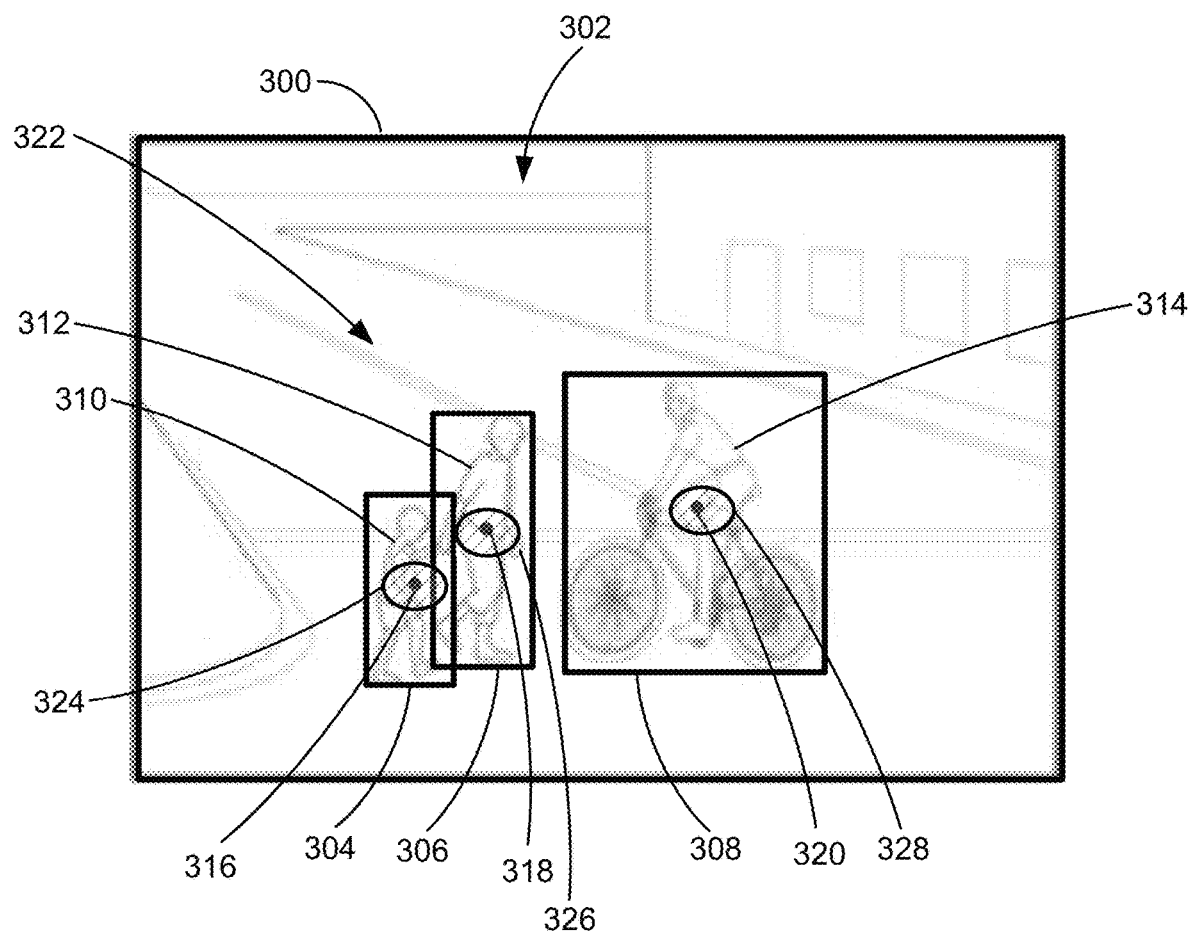
FIG. 3 is a diagram of another example image of a traffic scene.

FIG. 3 is a diagram of an image 300 of a traffic scene 302. The image 300 includes two-dimensional (2D) bounding boxes 304, 306, 308 surrounding pedestrians 310, 312 and a bicyclist 314, respectively. Pedestrians 310, 312 and bicyclist 314 can be referred to collectively as moving objects 322. Centers 316, 318, 320 of the pedestrians 310, 312 and the bicyclist 314, respectively are encoded as Gaussian heatmaps 324, 326, 328 on the 2D image 300 corresponding to the 2D bounding boxes 304, 306, 308, respectively. A Gaussian heatmap 324, 326, 328 is a data visualization technique that illustrates the magnitude of a variable by encoding it as colors. For example, the value of a variable can be encoded as colors corresponding to blackbody radiation, where increasing values are encoded as colors ranging from black through red, orange, and yellow, to white. A Gaussian heatmap 324, 326, 328 is a 2D Gaussian function corresponding to probability distribution of locations of the center of an object encoded as a heatmap. 2D bounding boxes 304, 306, 308 can be determined by inputting an image 300 to a DNN. DNNs are described in relation to FIG. 6, below. The DNN identifies objects in the image 300 and constructs three-dimensional (3D) bounding boxes corresponding to the moving objects 322. A face of the 3D bounding box corresponding to a 2D bounding box 304, 306, 308 parallel to the image plane is selected for the moving objects 322 and a center of the 3D bounding box corresponding to the center of a Gaussian heatmap 324, 326, 328 is projected onto the 2D bounding box 304, 306, 308 to correspond to the centers 316, 318, 320 of the pedestrians 310, 312 and the bicyclist 314, respectively.

Figure 4:
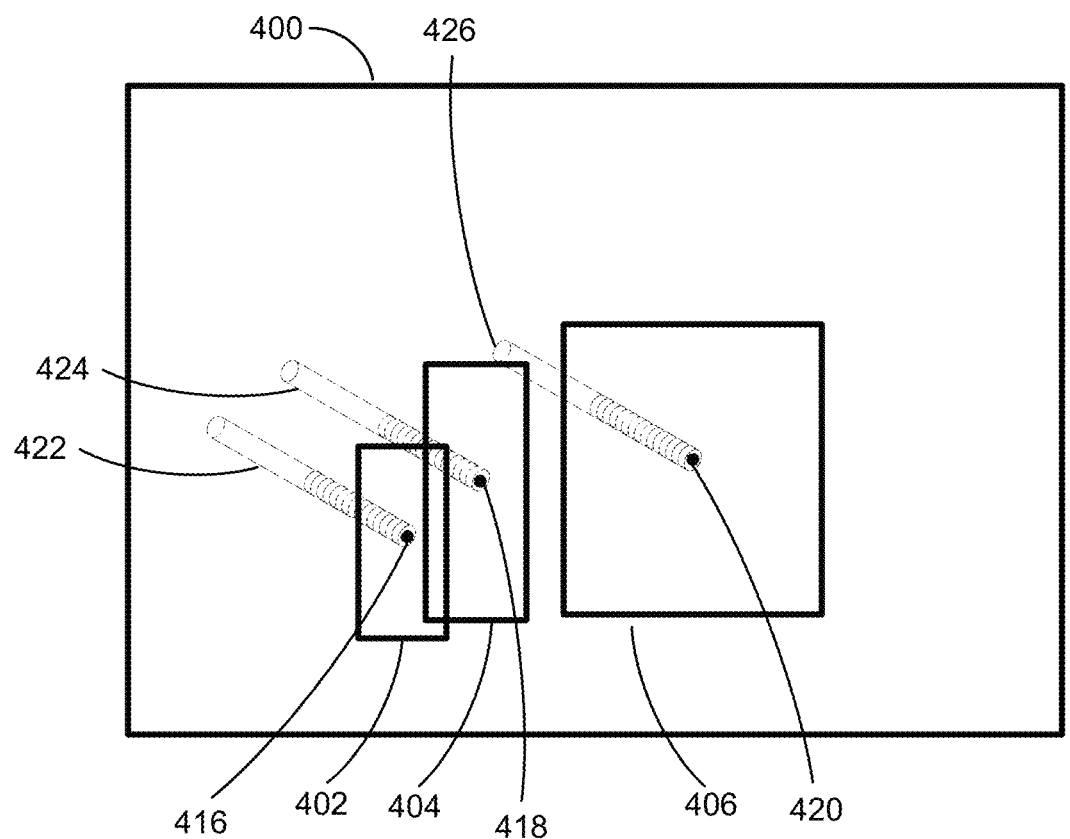
FIG. 4 is a diagram of an example image of two-dimensional object bounding boxes and object vectors.

FIG. 4 is a diagram of an image 400 following processing with a DNN. Image 400 includes 2D bounding boxes 402, 404, 406 and centers 416, 418, 420 corresponding to moving objects 322 from image 300 in FIG. 3. Image 400 includes object vectors 422, 424, 426 which encode data regarding the moving objects 322. The object vectors 422, 424, 426 are located at the centers 416, 418, 420 of moving objects 322, respectively and extend into a third dimension perpendicular to the plane of image 400.

Figure 5:
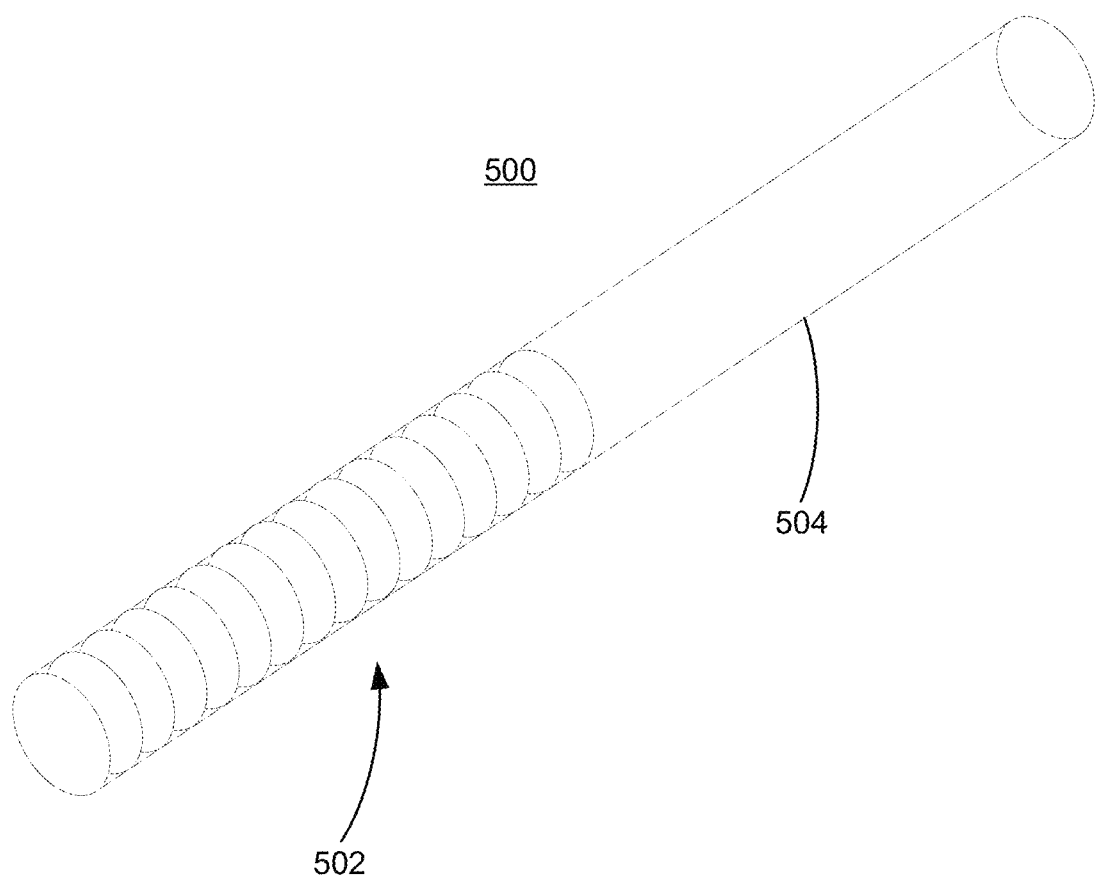
FIG. 5 is a diagram of an example object vector.

FIG. 5 is a diagram of an object vector 500. Object vector 500 includes object parameters 502 and an object descriptor 504. Object parameters 502 and object descriptor 504 are determined by the DNN. An object descriptor is an n-dimensional vector that describes each instance of the objects in an image 400. Object parameters 502 are data regarding the object specified by the object descriptor 504. Object parameters 502 include a k-dimensional one-hot vector that identifies an object class. A k-dimensional one-hot vector is a binary vector (i.e., includes only elements having values of either 0 or 1) with k elements where only one element is equal to "1" and the rest are equal to "0". The position of the "1" element corresponds to the class of the object, such as "pedestrian", "bicyclist", or "vehicle", for example.

Object parameters 502 also include an estimated distance from the camera lens to the moving object 314 described by the object vector 500, the length of the object, the width of the object, and the height of the object. Object parameters also include cos(θ) and sin(θ), where θ is the local yaw of the object. Local yaw is the angle of the object with respect to a plane Gaussian heatmap and the object's distance from the camera lens. A 3D bounding box for an object can be determined by combining a determined object class label with a determined 2D yaw of the object in pixels and a distance to the object. A library of 3D bounding boxes for the object classes can be determined at training time and included in the DNN. For example, pedestrians, bicycles, and vehicles can have 3D bounding boxes that can be re-sized and rotated based on the determined distance and pixel yaw. Based on the re-sized and rotated 3D bounding box, a 3D center in pixel coordinates can be determined. The 2D coordinates of the heatmap center can be determined by projecting the 3D center of the 3D bounding box onto the image plane. A 3D center of the heatmap in global coordinates $x_{3d}$, $y_{3d}$ can be computed as shown in equations (1) and (2), where $x_{2d}$ and $y_{2d}$ are 2D coordinates of the heatmap center, z is the estimated distance of object from camera in meters, $f_x$ and $f_y$ are x and y focal lengths of the camera lens in the x and y directions, respectively.

$$x_{3d} = x_{2d} * \frac{z}{f_x} \quad (1)$$

$$y_{3d} = y_{2d} * \frac{z}{f_y} \quad (2)$$

Appearance of the object in a monocular RGB image 300 only depends on the local orientation of the object i.e., the 2D yaw of the object. 3D object detection based on a monocular RGB image can include the DNN regressing the local yaw instead of global yaw. Regressing local yaw enables the DNN to better determine object orientation. In this context, regressing means the processing performed by the DNN on the input data to obtain the output data. Obtaining global yaw then requires computing a ray angle using equation (4), which can then be used to compute object global yaw.

$$ray_{angle} = \tan^{-1}\left(\frac{x_{3d}}{z}\right) \quad (3)$$

$$yaw_{global} = yaw_{local} + ray_{angle} \quad (4)$$

The DNN can also predict future positions of the object. Because the model input is in pixel coordinates, it typically requires less computation and provides more accurate results for the DNN to predict object pixel offsets, $X_{px\_offset}$ and $Y_{px\_offset}$ in the pixel coordinates as well. For obtaining the complete real world pose of the object, the offset in object distance from camera center, $Z_{offset}$ can be predicted. The object is assumed to have same yaw in both pixel coordinates and real world coordinates for simplicity. Alternatively, yaw offset, $Yaw_{offset}$, the difference between pixel coordinate yaw and real-world coordinate yaw, can be predicted. Given the current object 2D center 416, 418, 420 and the next frame offsets, the future pose of the objects in the real world can be determined.

The object vector 500 also includes an object descriptor. An object descriptor is an n-dimensional vectors which defines a specific object, and that can be used to track the object through frames of image data by finding the closest match in the n-dimensional manifold. The n-dimensional manifold is an n-dimensional surface in the n-dimensional space that includes the n-dimensional vectors being matched. The DNN can be trained determine the closest match between an object descriptor in a current image 300 and an object descriptor in a previous image using unsupervised learning by pulling together the descriptors corresponding to the same object through frames while pushing apart the descriptors for every other object.

Pulling matching descriptors together refers to training the DNN to generate similar descriptors when the similar objects are repeatedly input. Pushing apart non-matching descriptors refers to training the DNN to generate different descriptors when different objects are input. Similar objects have similar appearances and are at similar locations in the image. Different objects have different appearances and are at different locations in the image. For example, a pedestrian walking in a cross walk will have similar enough appearances and locations in sequential frames of image data to have matching descriptors pulled together during training. Two different pedestrians in the same crosswalk at the same time will be different enough in appearance and location in sequential frames of image data to have non-matching descriptors pulled apart during training. Pulling together matching descriptors permits moving objects to be tracked in a sequence of frames of image data. A DNN can be trained to pull together matching descriptors and push apart non-matching descriptors using loss functions as described below in relation to FIG. 6.

Figure 6:
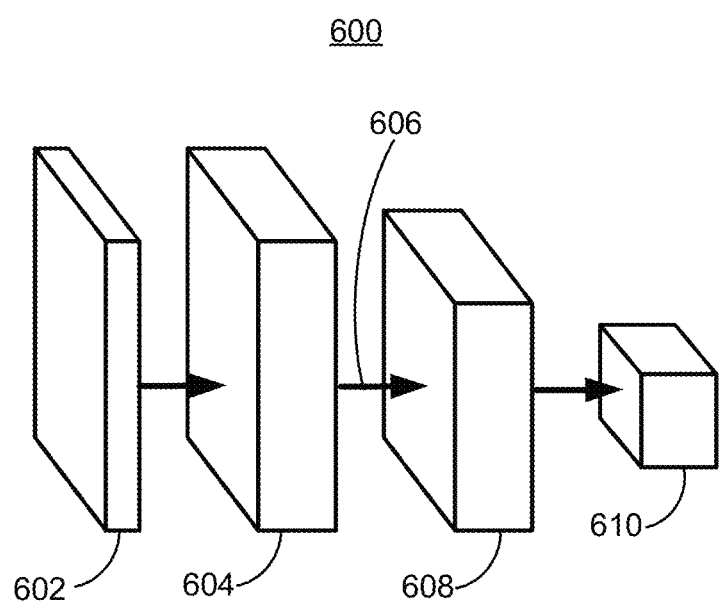
FIG. 6 is a diagram of an example convolutional neural network.

FIG. 6 is a block diagram of a DNN 600. DNN 600 inputs an image 602 and outputs one or more object vectors 610 corresponding to moving objects 322 included in input image 602. DNN 600 can be a convolutional neural network (CNN). A CNN includes convolutional layers 604 which convolve the input image 602 using a plurality of convolutional kernels and output latent variables 606 to fully connected layers 608. Fully connected layers 608 process the latent variables 606 with a plurality of linear and/or non-linear algebraic functions to determine one or more object vectors 610 corresponding to moving objects 322 included in input image 602.

DNN 600 can be trained using a training dataset that includes a plurality of input images 602 and user determined ground truth corresponding to the input images 602. Ground truth includes data regarding the—real world locations of objects included in the training dataset. Data regarding the real-world locations of objects in the training dataset can be determined by any suitable technique, such as by acquiring pairs of stereo images corresponding to images 602 included in the training dataset. The pairs of stereo images can be processed by determining stereo disparity between image data points corresponding to the same real-world location. Stereo disparity measures the displacement of image data points in the two stereo images and can be combined with the distance between the two stereo cameras to determine the distance from the stereo cameras to a point in the real-world coordinates.

During training, parameters corresponding to the convolution kernels and algebraic functions can be randomly selected and an input image 602 is processed to determine one or more object vectors 610. The object vectors 610 can be compared to the ground truth corresponding to the input image 602 and loss functions can be determined. The loss function is input to the convolutional layers 604 and fully connected layers 608 to select parameters for the convolution kernels and algebraic functions that result in the best correspondence between the binary object vectors 610 and ground truth, thus training the second DNN 600. Loss functions can be determined for object class prediction loss, object depth prediction loss, object dimension loss, where object dimensions include width, height and length, and object descriptor push and pull loss.

An object class prediction loss function measures how closely an object class prediction parameter in an object vector 500 compares with user-determined ground truth object class. Object class prediction loss $L_c$ can be determined by the equation:

$$L_c = -\left[\frac{1}{M}\sum(2*\sigma(y_c))e^{\gamma}\log(\sigma(\hat{y}_c))\right] + \left[\frac{1}{M}\sum(1-\sigma(y_c))e^{\gamma}\log(1-\sigma(\hat{y}_c))\right] \tag{5}$$

Where $y_c$ is the ground truth object class, $\hat{y}_c$ is the object class prediction, $\sigma(\bullet)$ is a Sigmoid function, M is the number of object vectors 610 and the class prediction loss is summed over the one or more object vectors 610. $\gamma$ is a user-selected odd integer used to weight the Gaussian heatmaps very highly because the Gaussian heatmaps occupy a small proportion of the image 602.

A depth prediction loss function measures how closely the object depth parameter in an output object vector 610 corresponds to the ground truth object depth determined by processing a pair of stereo images corresponding to an input image 602. Depth prediction loss $L_Z$ can be determined by the equation:

$$L_Z = \frac{1}{M}\sum\left\{\frac{1}{[Z+\varepsilon]} - \frac{1}{[\sigma(\hat{y}_c)+\varepsilon]}\right\}^2 \tag{6}$$

Where M is the number of object vectors 610 and the depth prediction loss function is summed over M. Z is the ground truth depth or distance to the object, $\sigma(\hat{y}_c)$ is a Sigmoid function applied to the predicted depth and $\varepsilon$ is a user-selected small number to avoid divide-by-zero errors. The depth Z is normalized to the interval [0,1] to be comparable to the output from the Sigmoid function.

Three dimension prediction loss functions, one each for lengths, widths, and heights of the one or more moving objects 322 measure how closely the predicted dimensions of the moving objects 322 compare to user-determined ground truth lengths, widths and heights of the moving objects 322. For example, length prediction loss $L_l$ can be determined by the equation:

$$L_l = \frac{1}{M}\sum(\hat{y}_{l_{norm}} - y_{l_{mean}})^2 \tag{7}$$

Where $$l_{norm} = \ln\left(\frac{l}{l_{mean}^{C_n}}\right) \Rightarrow l = l_{mean}^{C_n} * e^{l_{norm}} \tag{8}$$

and where $l_{mean}^{C_n}$ is the mean object length corresponding to object class n. Object width and object height prediction loss functions $L_w$ and $L_h$ are determined according to similar equations.

DNN 600 is trained to predict object descriptors 504 in an unsupervised fashion by determining an object descriptor pull loss function $L_{pull}$ and an image descriptor pull loss function $L_{push}$. Object descriptor pull and push loss functions can be determined based on comparing a plurality of object descriptors from pairs of right and left stereo images $d_i^R$, $d_i^L$. Object descriptor pull loss can be determined by the equation:

$$L_{pull} = \frac{1}{N}\sum_{i=1}^{N}(d_i^L - d_i^R)^2 \tag{9}$$

Object descriptor pull loss function provides low loss values for similar object descriptors determined for instances of the same objects, i.e., "pulling" the object descriptors closer together. Object descriptor push loss functions can be determined by the equation:

$$L_{push} = \frac{1}{N(N-1)} \sum_{i=1}^{N} \sum_{\substack{j=1 \\ i \neq j}}^{N} \max(0, \nabla - |d_i^L - d_j^R|) \quad (10)$$

Where $\nabla$ is a user-determined small constant, for example=1. The object descriptor push loss function provides a low loss function when object descriptors 504 for different instances of objects to "push" the object descriptors to be different. The object descriptor push loss function does this by maximizing the term $|d_i^L - d_j^R|$ while maintaining a limit, $\nabla$, to provide numerical stability, otherwise the object descriptor push loss function can dominate the loss function and prevent the other loss functions from influencing training. An object descriptor matching function $L_{matching}$ can be determined by combining the object descriptor pull loss function $L_{pull}$ and the image descriptor pull loss function $L_{push}$:

$$L_{matching} = L_{pull} + L_{push} \quad (11)$$

An object offset prediction loss function can be determined based on how well predicted image domain offsets $X_{px\_offset}$ and $Y_{px\_offset}$ match ground truth offsets. Ground truth offsets can be determined based on comparing object locations from a frame of image data acquired at a time t with object location data determined based on frames of video data acquired at times t−1, t−2, etc. The object offset prediction loss $L_{offset}$ can be determined in a similar fashion to the three dimension prediction loss functions described in equations (7) and (8), above. An overall loss function $L_{overall}$ can be determined as the sum of the previously described loss functions:

$$L_{overall} = L_c + L_z + L_l + L_w + L_h + L_{matching} + L_{offset} \quad (12)$$

Figure 7:
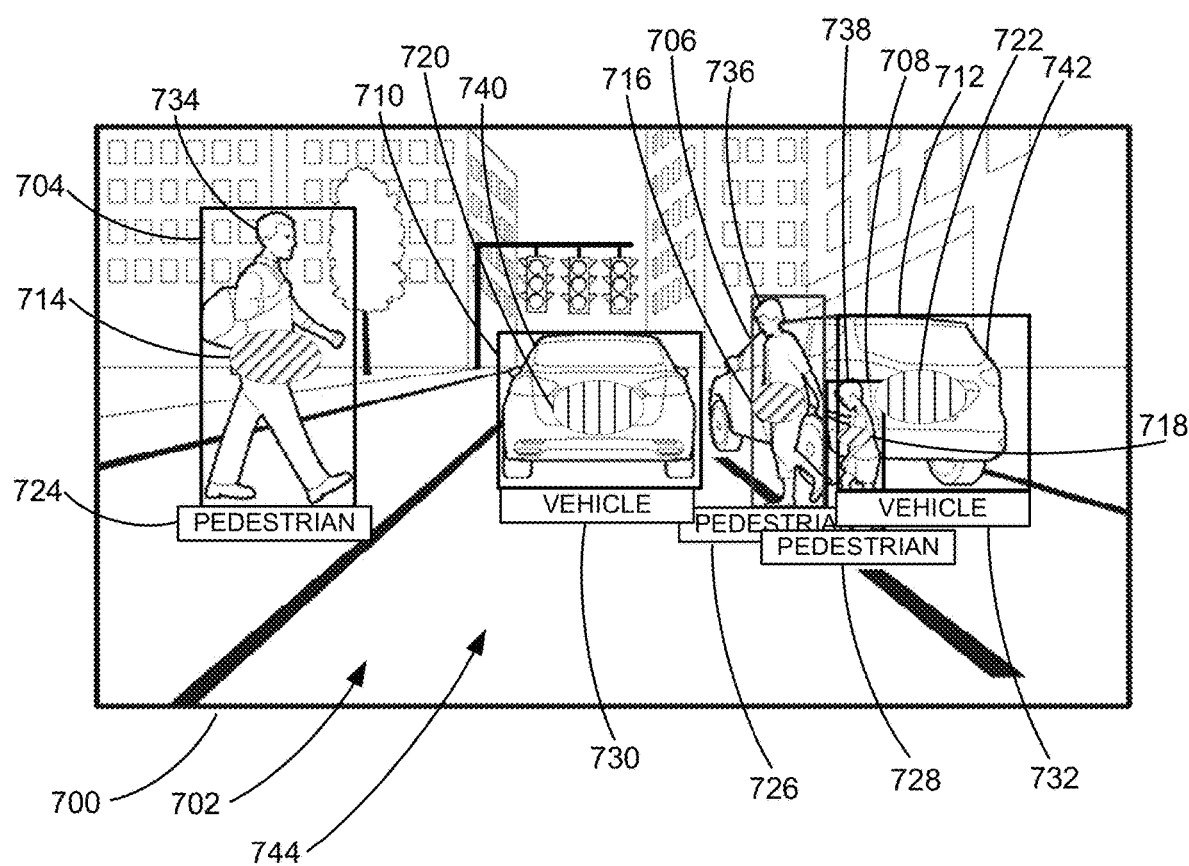
FIG. 7 is a diagram of another example image of a traffic scene.

FIG. 7 is a diagram of an image 700 of a traffic scene 702 illustrating results of processing the image 700 with DNN 600 trained as discussed in relation to FIG. 6 to determine bounding boxes 704, 706, 708, 710, 712, Gaussian heat maps 714, 716, 718, 720, 722 and labels 724, 726, 728, 730, 732 corresponding to pedestrians 734, 736, 738 and vehicles 740, 742. pedestrians 734, 736, 738 and vehicles 740, 742 can be referred to collectively as moving objects 744. DNN 600 can detect and track moving object 744 in six degree of freedom (DoF) poses. A six DoF pose include an object's location in three global coordinates with respect to three orthogonal x, y, and z axes and three rotational coordinates (roll, pitch, and yaw) measured with respect to the x, y, and z axes, respectively. The object vectors 610 output from the DNN 600 also predict future poses for the moving objects 744 based on the predicted object offsets, $X_{px\_offset}$ and $Y_{px\_offset}$.

Figure 8:
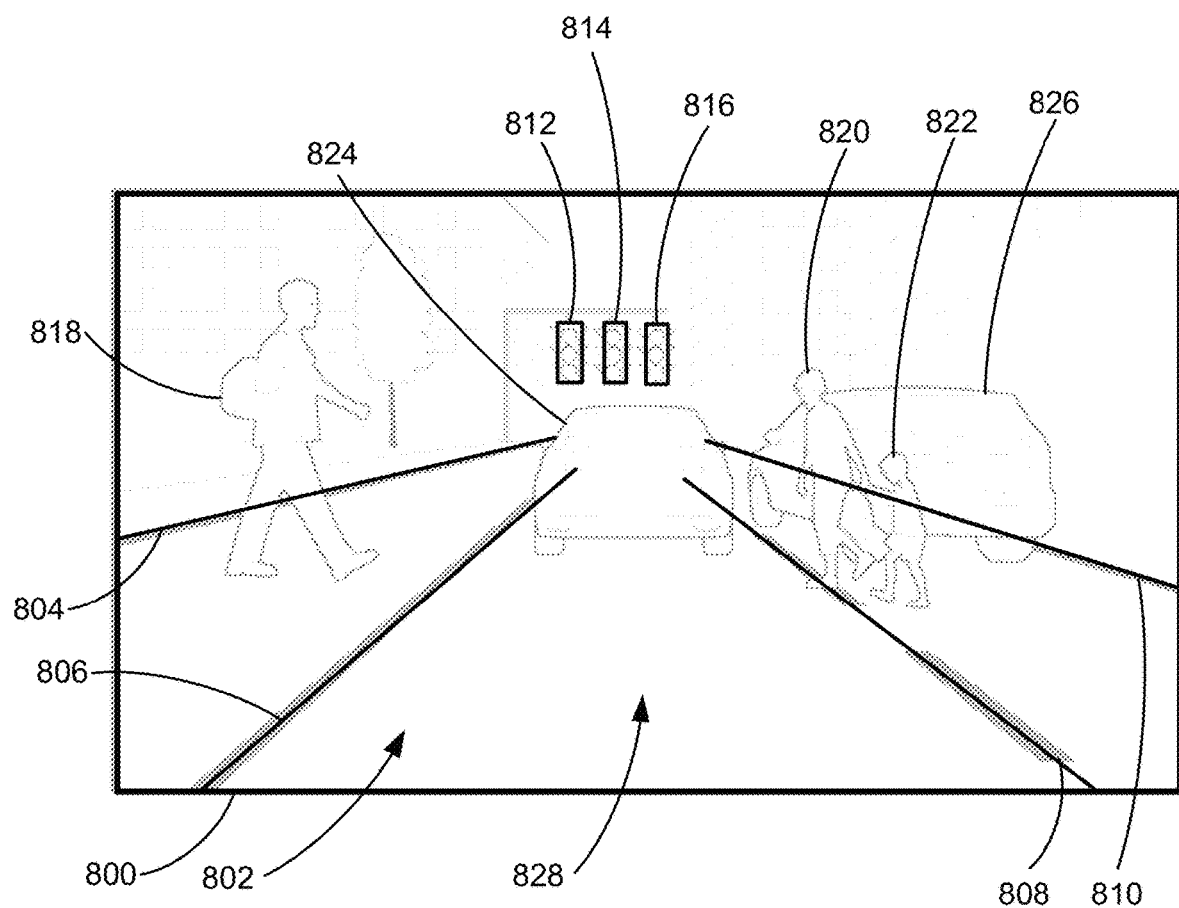
FIG. 8 is diagram of an example image of two-dimensional object bounding boxes.

FIG. 8 is a diagram of an image 800 of a traffic scene 802 illustrating how the DNN 600 discussed in relation to FIG. 6, above can be extended to identify and locate objects in an environment around a vehicle 110 in addition to moving objects 744. Image 800 includes traffic lane markers 804, 806, 808, 810 and traffic signals 812, 814, 816 detected by DNN 600. Traffic lane markers 804, 806, 808, 810 and traffic signals 812, 814, 816 can be collectively described as static objects 828. FIG. 8 illustrates occlusion-aware lane segmentation and instance descriptor regression. Occlusion-aware lane segmentation is the ability to extrapolate the location of traffic lane markers 804, 806, 808, 810 in the presence of occluding objects including pedestrians 818, 820, 822 and vehicles 824, 826. Instance descriptors are 1-dimensional vectors similar to an object descriptor 504, but in the context of a traffic lane marker instance, for example, it describes which traffic lane marker instance each pixel corresponding to a traffic lane marker line belongs to. From the image 800, DNN 600 predicts the traffic lane markers 804, 806, 808, 810 line segmentation, and then depth for each of the pixels corresponding to lane lines are regressed as a part of the third dimensional object vector 500 as described in relation to FIG. 5, above. This can be done in an unsupervised fashion as discussed in relation to FIG. 6, above. An object descriptor corresponding to each traffic lane marker 804, 806, 808, 810 instance can be regressed using push and pull loss functions as described above in relation to FIG. 6. Push and pull loss functions can train DNN 600 to determine object descriptors 504 lane instances that permit pixel points on the same lane instance to be pulled as close to each other as possible and be pushed away from different lane instances.

Other static objects 828 such as traffic signals 812, 814, 816 are also represented as points and their 2D center are encoded as Gaussian heatmaps. Additional information such as distance from camera, traffic signal color, etc. can be encoded in a third dimensional object vector as described above in relation to FIG. 5. Static object data as illustrated in FIG. 8 can be combined with moving objects 744 illustrated in FIG. 7 to yield a complete traffic scene 702, 802 representation from the point of view of a vehicle 110 or traffic infrastructure system 105. Computing device 115 can use offset predictions from the object descriptors to track moving objects 744. A computing device 115 or server computer 120 can take tracking data based on moving objects 744 and location data regarding static objects 828 as inputs and determine a vehicle path for a vehicle 110 to travel while avoiding objects and following traffic rules.

Figure 9:
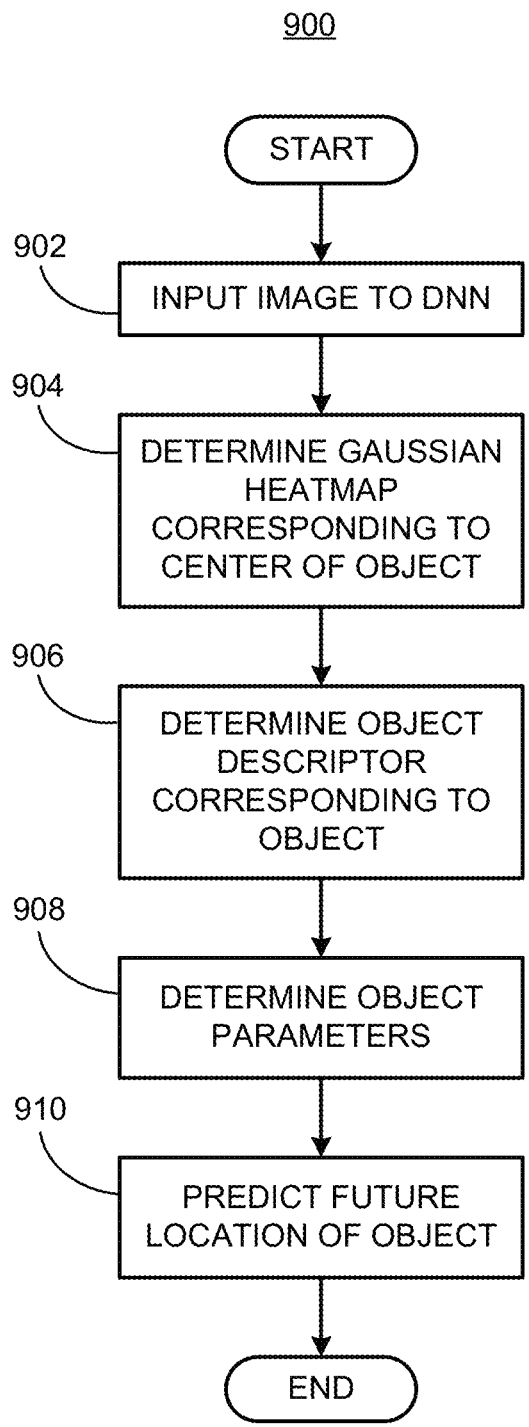
FIG. 9 is a flowchart diagram of an example process to predict future locations of objects in image data using object vectors.

FIG. 9 is a flowchart, described in relation to FIGS. 1-8, of a process 900 for determining moving and static objects 744, 828 in image data acquired by sensors 116 included in a vehicle 110 or sensors 122 included in a traffic infrastructure system 105. Process 900 can be implemented by a processor of a computing device 115 or server computer 120, taking as input image data from sensors 116, 122, executing commands, and outputting object vectors 610 corresponding to moving and static objects 744, 828. Process 900 includes multiple blocks that can be executed in the illustrated order. Process 900 could alternatively or additionally include fewer blocks or can include the blocks executed in different orders.

Process 900 begins at block 902, where a computing device 115 inputs a monocular RGB image 700 to a DNN 600. The monocular RGB image 200 can be acquired by a camera included in a vehicle 110 or a camera included in a traffic infrastructure system 105.

At block 904 DNN 600 determines a Gaussian heatmap corresponding to the center of a 3D object projected onto a 2D bounding box corresponding to an image plane the image 700 as discussed in relation to FIG. 3, above.

At block 906 DNN 600 determines an object vector 500 corresponding to the static and moving objects 744, 828 included in an image 700 as discussed in relation to FIGS. 4 and 5, above.

At block 908 DNN 600 outputs an object vector 500 that includes object parameters 502 and an object descriptor 504 for the objects 744, 828 included in the image 700 as described above in relation to FIG. 6, above.

At block 910 the object vector 500 is used to predict future locations of moving objects 744 included in image 700 as discussed in relation to FIG. 6, above. After block 910 process 900 ends.

Figure 10:
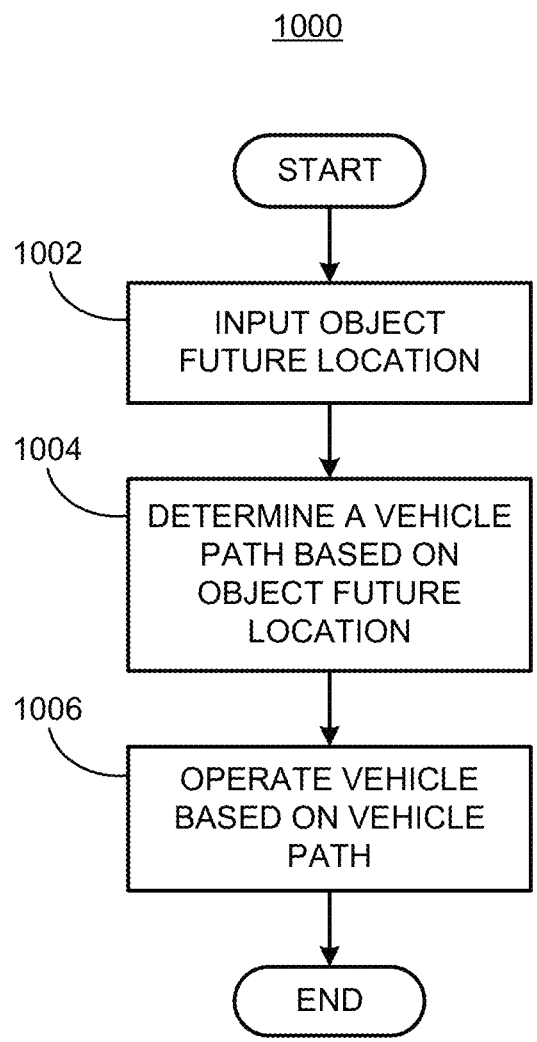
FIG. 10 is a flowchart diagram of an example process to operate a vehicle based on predicted future locations of objects.

FIG. 10 is a diagram of a flowchart, described in relation to FIGS. 1-9, of a process for operating a vehicle 110 based on future locations of moving objects 744 determined by DNN 600 described in process 900 in FIG. 9, above. Process 1000 can be implemented by a processor of a computing device 115, taking as input data from sensors 116, and executing commands, and operating vehicle 110. Process 1000 includes multiple blocks that can be executed in the illustrated order. Process 1000 could alternatively or additionally include fewer blocks or can include the blocks executed in different orders.

Process 1000 begins at block 1002, where a computing device 115 in a vehicle 110 downloads future locations corresponding to moving objects 744 included in an image 700 acquired by a camera included in a vehicle 110, for example.

At block 1004 computing device 115 determines a vehicle path based on the future locations of corresponding to moving objects 744 included in an image 700. A vehicle path is a polynomial function that includes maximum and minimum lateral and longitudinal accelerations to be applied to vehicle motion as it travels along the vehicle path. Because static and moving objects 744, 828 are determined by a single DNN 600 using a monocular RGB image 700, a vehicle path can be determined more quickly using less expensive sensor and fewer computing resources than would be required if stereo pairs of images or lidar or radar range imaging were employed.

At block 1006 computing device 115 outputs commands to controllers 112, 113, 114 to control vehicle powertrain, vehicle steering, and vehicle brakes to control vehicle motion to operate vehicle 110 along the vehicle path determined at block 1004. Following block 1006 process 1000 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
   a processor; and
   a memory, the memory including instructions executable by the processor to:
   input an image to a deep neural network trained to determine an object vector with object class prediction loss functions that include an object class prediction loss and an object descriptor push and pull loss to:
   determine a point in the image based on a center of a Gaussian heatmap corresponding to an object included in the image;
   determine an object descriptor corresponding to the object and include the object descriptor in an object vector attached to the point;
   determine object parameters including a three-dimensional location of the object in global coordinates and predicted pixel offsets of the object;
   include the object parameters in the object vector; and
   predict a future location of the object in the global coordinates based on the point and the object vector.

2. The computer of claim 1, the instructions including further instructions to operate a vehicle by determining a vehicle path based on the future location of the object.

3. The computer of claim 2, wherein operating the vehicle on the vehicle path includes controlling one or more of vehicle powertrain, vehicle steering, and vehicle brakes.

4. The computer of claim 1, wherein the object is a moving object.

5. The computer of claim 1, wherein the deep neural network tracks the object in one or more frames of image data based on the object descriptor.

6. The computer of claim 1, wherein the deep neural network determines the three-dimensional location of the object in the global coordinates based on an estimated distance from a camera and the point corresponding to the center of the Gaussian heatmap.

7. The computer of claim 6, wherein a yaw of the object is determined in the global coordinates based on the yaw of the object in pixel coordinates and the three-dimensional location of the object in the global coordinates.

8. The computer of claim 7, wherein the future location of the object in the global coordinates is determined based on the predicted pixel offsets of the object and the three-dimensional location of the object.

9. The computer of claim 1, wherein the deep neural network is trained based on unsupervised learning.

10. The computer of claim 1, wherein the deep neural network is trained based on ground truth determined based on one or more pairs of stereo images.

11. The computer of claim 1, wherein the deep neural network is trained based on object class prediction loss functions, depth perception loss functions, three-dimensional prediction loss functions, push object descriptor loss functions, and pull object descriptor loss functions.

12. A method, comprising:
inputting an image to a deep neural network trained to determine an object vector with object class prediction loss functions that include an object class prediction loss and an object descriptor push and pull loss to:
  determine a point in the image based on a center of a Gaussian heatmap corresponding to an object included in the image;
  determine an object descriptor corresponding to the object and include the object descriptor in an object vector attached to the point;
  determine object parameters including a three-dimensional location of the object in global coordinates and predicted pixel offsets of the object;
  include the object parameters in the object vector; and
  predict a future location of the object in the global coordinates based on the point and the object vector.

13. The method of claim 12, further comprising operating a vehicle by determining a vehicle path based on the future location of the object.

14. The method of claim 13, wherein operating the vehicle on the vehicle path includes controlling one or more of vehicle powertrain, vehicle steering, and vehicle brakes.

15. The method of claim 12, wherein the object is a moving object.

16. The method of claim 12, wherein the deep neural network tracks the object in one or more frames of image data based on the object descriptor.

17. The method of claim 12, wherein the deep neural network determines the three-dimensional location of the object in the global coordinates based on an estimated distance from a camera and the point corresponding to the center of the Gaussian heatmap.

18. The method of claim 17, wherein a yaw of the object is determined in the global coordinates based on the yaw of the object in pixel coordinates and the three-dimensional location of the object in the global coordinates.

19. The method of claim 18, wherein the future location of the object in the global coordinates is determined based on the predicted pixel offsets of the object and the three-dimensional location of the object.

20. The method of claim 12, wherein the deep neural network is trained based on unsupervised learning.

* * * * *